(12) United States Patent
Merrette et al.

(10) Patent No.: US 6,843,888 B2
(45) Date of Patent: Jan. 18, 2005

(54) STARCHES FOR USE IN PAPERMAKING

(75) Inventors: Michele M. Merrette, Bridgewater, NJ (US); John J. Tsai, Belle Mead, NJ (US); Paul H. Richardson, Plainsboro, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 346 days.

(21) Appl. No.: 09/804,791

(22) Filed: Mar. 13, 2001

(65) Prior Publication Data

US 2002/0170693 A1 Nov. 21, 2002

(51) Int. Cl.$^7$ ............................................... D21H 17/24
(52) U.S. Cl. ..................... 162/175; 106/206.1; 536/102; 536/106
(58) Field of Search ....................... 162/175; 106/206.1; 536/102, 106

(56) References Cited

U.S. PATENT DOCUMENTS

| | | | |
|---|---|---|---|
| 3,884,909 A | * 5/1975 | Kightlinger et al | ...... 260/233.3 |
| 5,122,231 A | 6/1992 | Anderson | .................... 162/175 |
| 5,523,339 A | 6/1996 | Solarek et al. | ................. 524/47 |
| 5,792,317 A | 8/1998 | Taylor et al. | ............... 162/175 |

FOREIGN PATENT DOCUMENTS

| | | |
|---|---|---|
| EP | 0361763 A2 | 9/1989 |
| EP | 0936309 A2 | 10/1999 |
| WO | WO 9700921 | 1/1997 |
| WO | WO 9746591 | 12/1997 |
| WO | WO 9822653 | 5/1998 |

OTHER PUBLICATIONS

Glittenberg, Detlev, "Starch alternatives for improved strength, retention, and sizing", *Tappi Journal*, vol. 76, No. 11, pp. 215–219.

Crill, Maria S., "Improving Starch Quality Upgrades Drainage, Wet End Performance", *Pulp & Paper*. Dec. 1987, pp. 109–111.

Szymanski, M.A.; Doiron, B., "A novel dry–strength system for paper and paperboard", Pulp & Paper Technical Association of Canada, 2000, 865 pp. 3 vols. (ISBN 189674235X) (C, K, P, S).

Gruber, E; Bothor, R; Dintelmann, T., "Modified granular starches for wet end application", EUCEPA Symposium 1988—Chemistry in Papermaking, Florence, Italy, Oct. 12–14, 1998, pp. 379–391 Milan, Italy: ATICELCA, 1998, 430pp (C, K, P, S).

Krogerus, B., "Modified Starch Pigments As Paper Additives", Minerals In Papermaking—Scientific and Technological Advances in fillers, Stockholm, Sweden, Feb. 9–10, 1999, 10pp letterhead, UK: Pira International, 1999, #95.00 (K,P,S).

* cited by examiner

*Primary Examiner*—Peter Chin
(74) *Attorney, Agent, or Firm*—David P. LeCroy

(57) ABSTRACT

This invention relates to a degraded, inhibited cationic starch for use in papermaking systems, which affords improved physical properties, particularly strength. Additionally these derivatives provide easy-to-prepare alternatives to traditional starches, and can even be added directly to the papermaking process without cooking. While the benefits of these starch compositions can be applied to any type of papermaking method, they are especially useful in high shear, high conductivity and recycle systems.

30 Claims, No Drawings

US 6,843,888 B2

STARCHES FOR USE IN PAPERMAKING

FIELD OF THE INVENTION

Background of the Invention

This invention relates to a ready for use starch product, which is degraded, inhibited and cationized for use in papermaking systems. Furthermore, the starches of this invention relate to easy-to-prepare or ready-for-use products affording improved processing, increased retention of fillers and pulp, resistance to high conductivity and high shear and enhanced strength of the resulting paper products.

The term "paper," as used herein, includes sheet-like masses and molded products made from fibrous cellulosic material, which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that the water is removed, thereby forming a sheet of the consolidated fibers, which upon pressing and drying can be processed into dry roll or sheet form. Typically in papermaking, the feed or inlet to the machine is an aqueous slurry or water suspension of pulp fibers, which is provided from what is called the "wet end" system. In the wet end, the pulp along with other additives are mixed in an aqueous slurry and subject to mechanical and other operations such as beating and refining to improve interfiber bonding and other physical properties of the finished sheet. Additives commonly introduced along with the pulp fibers are pigments such as titanium dioxide, mineral fillers such as clay and calcium carbonate and other materials introduced into paper to achieve such properties as improved brightness, opacity, smoothness, ink receptivity, fire retardancy, water resistance, increased bulk, etc.

Providing strength in today's pulp furnishes has become increasingly difficult due to recycle fiber, closed water systems consisting of high conductivity and other contaminants, and high shear equipment. There is a need for wet end additives to be more resistant to these hostile forces in order to provide maximum benefit.

Starch has been used in the paper industry for many years and in fact, is the second largest volume raw material component in paper. Starches perform three of the most important items required in papermaking; strength improvement, improved retention of fibers and fillers, and increased drainage rate. Both unmodified and modified types have been used. However, due to the complexity of today's pulp furnishes, sizing chemicals and other chemicals present, cationic modified starches are preferred since they are retained to a high degree, by interacting with the anionic cellulose, in the paper machine furnish.

Various cationic starches are known and used in the paper industry with the tertiary amino and quaternary ammonium starch ethers being the most commercially significant derivatives. These and other cationic starches as well as the method of preparing them are described in "Cationic Starches" by D. B. Solarek, *Modified Starches: Properties and Uses*, Chapter 8, pp. 113–129, 1986.

Inhibition is known to affect both the textural and viscosity properties of starch. It strengthens and helps hold the starch granules together and at higher levels, retards swelling and prevents solubilization. While the inhibition of starch, either by itself or in combination with other starch modifications, has been used in a number of applications, it has not been used to a large extent in papermaking. An early patent, U.S. Pat. No. 3,417,078 issued Dec. 17, 1968 to C. Patel discloses the use of a cationic starch in the manufacture of paper, the starch being a selected imidazoline derivative which is also reacted with a inhibition agent such as dichlorobutene. Another patent publication, EPO 097,371 published Jan. 4, 1984 to S. Frey discloses the use of nongelatinized starch which is cationized and partly inhibited in a papermaking process.

Three recent patents further disclose the use of cationized/inhibited starches in papermaking processes. U.S. Pat. No. 5,122,231 issued Jun. 16, 1992 to K. Anderson discloses an improved method of papermaking wherein a cationic starch is subsequently inhibited after cationization and then added to the wet end of the papermaking system to provide increased starch loading capacity. U.S. Pat. No. 5,523,339 issued Jun. 4, 1996 to D. Solarek et al. discloses the preparation and use in paper systems of inhibited cationic starches by high temperature (jet or steam injection) cooking of full molecular weight starches. WO 97/46591 published Dec. 11, 1997 to R. Neale discloses the use of a highly inhibited cationized starch that can be swollen, but not dispersed into the aqueous papermaking system.

The use of starch in papermaking systems has been well documented for many years. There are references that relate the molecular weight of the starch to the efficiency in retention and strength (M. S. Crill, Pulp and Paper, December 1987, pages 109–111 and D. Glittenberg, TAPPI Journal, Vol 76, No. 11, 1993, pages 215–219), indicating a need to maintain molecular weight for the optimum in performance.

While the general applicability of using inhibited, cationized starch in papermaking has been disclosed previously as noted above, significant strength improvements are still desirable. There is also a need in the industry to provide easy to prepare starches for wet end applications where the starch can provide enhanced processing and improved physical properties. Easy to prepare starches can also be of great utility in eliminating the need for cook equipment, reducing water and steam demands and reduce safety concerns related to handling of high temperature liquids and equipment.

SUMMARY OF THE INVENTION

The present invention fulfills this need by providing starch based paper additives that can be prepared without the need for ultra high temperatures, high-pressure steam or long cooking times. Additionally these starches provide improvements in processing and significant increases in strength of the final paper article. Increased strength will allow one skilled in the art to reduce the amount of pulp by adding fillers, recycled fiber, reduce refining or reducing the overall weight of the sheet while maintaining all the strength requirements.

Now, in accordance with this invention it has been found that the use of a selected degraded, inhibited cationic starch as an additive in the wet end of a papermaking process provides significant and unexpectedly improved process performance and strength to the final paper product.

One aspect of this invention is directed to the use of degraded starch as the starting material for the cationization reaction and subsequent inhibition. A further embodiment is that the starches useful herein are easily dispersed in warm or hot water without the typical long cooking times and extended high temperatures.

More particularly, this invention relates to a method of making paper comprising adding a degraded, inhibited and cationized starch to the wet end of the system at a point before the formation of the web wherein the starch has been degraded to a fluidity value of at least about 20 and inhibited by adding enough inhibition agent to increase the viscosity of the base degraded starch by about 30 to 800 percent. Additionally the starches of this invention will contain a cationic group to aid in the retention of the starch in the papermaking system and will typically have between about 0.1 and 1.0% or greater cationic nitrogen.

DETAILED DESCRIPTION OF THE INVENTION

The present invention pertains to a degraded, inhibited and cationized starch for use in papermaking systems. Such modified starches do not require cooking at boiling water temperatures or above, thus providing ease of preparation, energy savings and elimination of many safety concerns while providing improved physical properties to the resulting paper.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose. The term "granular starch" is intended to mean any starch (including chemically modified) that is in the same physical form as found in nature (i.e. not swollen or gelatinized).

Starches of this invention must be degraded at some point during their preparation, preferably before the cationization and inhibition. Means for degrading starches are well known in the literature and include the action of heat and or acids, hydrolytic enzymes, oxidative degradation (including catalytic oxidation) and thermal processes such as dextrinization.

The level of degradation will vary depending on the amount and type of inhibition chosen and the cooking temperature and dispersion method (e.g., adding dry powder directly to the paper machine). Typical level of degradation for this invention will include a water fluidity range of about 15 to about 85, particularly about 20 to 70, most suitably about 40 to 65. Water fluidity is a relative measurement of the viscosity compared to native starch (WF=0) and water (WF=100).

The inhibited starch used in the invention may include starch which is treated with at least one of a number of multifunctional inhibition agents such as disclosed in "Starch Derivatives: Production and Uses" by M. Rutenberg and D. Solarek, *Starch: Chemistry and Technology,* Chapter X, pp. 324–322, 1984. Such inhibition agents include but are not limited to bifunctional etherifying and/or esterifying agents such as epichlorohydrin, bis-β-chloroethyl ether, dibasic organic acids, phosphorus oxychloride, trimetaphosphate (i.e., the alkali and alkaline earth metal salts), linear mixed anhydrides of acetic and di- or tribasic carboxylic acids. Difunctional reagents containing aldehydes or ketones can also be useful in the preparation of inhibited starches of this invention. Another useful inhibition agent is sodium hypochlorite, which when used in the proper amount and under proper pH conditions (11 or more) provides inhibited starch. Suitable inhibition agents are epichlorohydrin, phosphorus oxychloride, adipic-acetic anhydrides and sodium trimetaphosphate, with epichlorohydrin being most particularly suitable.

Alternately, the use of physical processes to provide the attributes of inhibition is acceptable if accomplished to the appropriate viscosity specifications. Examples of these types of physical processes include, but are not limited to, dry thermal processing, annealing, effects of UV light, agglomerating and the like.

The level of inhibition is critical to the current invention. Typical chemical treatment levels of about 0.05 to 0.001, more suitably between 0.0125 and 0.002 percent, based on dry starch weight are employed.

We have found the best way to measure the level of inhibition is the increase in viscosity of the inhibited material compared to the starting material (before inhibition). For the purpose of this invention viscosity is defined as peak viscosity as described in example 4 and used to compare the effects of inhibition. The ratio of inhibited viscosity to uninhibited viscosity should be between 1.1 and 10, more suitably between 1.3 and 8, and most suitably between 1.5 and 5. Alternatively stated, the starch would have a final viscosity of between 110 and 1000 percent, more suitably between 130 and 800 percent, and most suitably between 150 and 500 percent of the un-inhibited starting degraded starch. Additionally, the peak viscosity of the degraded, cationized, inhibited starches suitable for this invention will be below about 500 cps, most suitably below about 250 cps but not less than about 5 cps. The presence of salts can effect the viscosity measurement and therefore all samples should be washed before measuring the peak viscosity.

The starches used in this invention besides being inhibited and degraded are also cationically treated. Cationization of the starch can be accomplished by well known chemical reactions with reagents containing amino, imino, ammonium, sulfonium or phosphonium groups as disclosed, for example, in *Solarek,* "Cationic Starches", supra, and in U.S. Pat. No. 4,119,487 issued Oct. 10, 1978 to M. Tessler. Such cationic derivatives include, but are not limited to, those containing nitrogen-containing groups comprising primary, secondary, tertiary and quaternary amines and sulfonium and phosphonium groups attached through either ether or ester linkages. The most suitable derivatives are those containing the tertiary amino and quaternary ammonium ether groups.

The general method for preparing starches containing tertiary amine groups, which involves reacting starch under alkaline conditions with a dialkylaminoalkyl halide is described in U.S. Pat. No. 2,813,093 issued on Nov. 12, 1957 to C. Caldwell, et al. Another method is disclosed in U.S. Pat. No. 4,675,394 issued Jan. 23, 1987 to D. Solarek, et al. The primary and secondary amine starches may be prepared by reacting the starch with aminoalkyl anhydrides, amino epoxides or halides, or the corresponding compounds containing aryl in addition to the alkyl groups.

Quaternary ammonium groups may be introduced into the starch by suitable treatment of the tertiary aminoalkyl ether of starch, as described in the previously noted U.S. Pat. No. 2,813,093. Alternatively, quaternary groups may be introduced directly into the starch by treatment with the reaction product of an epihalohydrin and a tertiary amine or tertiary amine salt, to provide for example, (3-timethylammonium chloride)-2-hydroxypropyl ether substituent groups as disclosed in the noted U.S. Pat. No. 4,119,487. The above noted patents, i.e., U.S. Pat. Nos. 4,119,487, 2,813,093 and 4,675,394 are incorporated herein by reference.

The preparation of cationic sulfonium derivatives is described in U.S. Pat. No. 2,989,520 issued June, 1961 to M. Rutenberg, et al. and essentially involves the reaction of starch in an aqueous alkaline medium with a beta-halogenoalkylsulfonium salt, vinylsulfonium salt or epoxyalkyl-sulfonium salt. The preparation of cationic phosphonium derivatives is disclosed in U.S. Pat. No. 3,077,469 issued Feb. 12, 1963 to A. Aszalos and involves reaction of starch in an aqueous alkaline medium with a beta-halogenoalkylphosphonium salt.

Other suitable cationic starches may be provided using reagents and methods that are well known in the art as illustrated in the above noted references. Further description of useful cationic starches are disclosed in U.S. Pat. No. 2,876,217 issued Mar. 3, 1959 to E. Paschall, U.S. Pat. No. 2,970,140 issued Jan. 31, 1961 to C. Hullinger, et al., U.S. Pat. No. 5,004,808 issued Apr. 2, 1991 to M. Yalpani, et al., U.S. Pat. No. 5,093,159 issued Mar. 3, 1992 to J. Fernandez, et al., and EP 406 837 published Jan. 1, 1991 (corresponding to U.S. application Ser. No. 516,024 filed Apr. 26, 1990), all of which are incorporated herein by reference. Particularly useful cationic derivatives are those containing amino or nitrogen groups having alkyl, aryl, aralkyl or cyclic substituents of up to 18 carbon atoms and especially alkyl of 1 to 6 carbon atoms.

The amount of cationic substituent on the starch can be varied and generally a degree of substitution (DS) of from about 0.005 to 0.5 and more suitably from about 0.01 to 0.05 will be used. The term "degree of substitution" (DS) as used herein means the average number of sites or substituent groups per anhydroglucose unit of the starch molecule.

The starches of this invention contain a cationic group to aid in the retention of the starch on the cellulosic fibers, but may contain other derivatives as well. These additional derivatives may include but are not limited to anionic, non-ionic, hydrophobic and amphoteric groups attached by either ether or ester linkages. It should be realized that if any modification is to be done by esterification, the sequence of reactions must be accomplished so that the esters are formed last and not hydrolyzed during further treatment at high pH.

In preparing the degraded, inhibited, cationic starches of this invention the sequence of steps for introducing the cationic group may be varied. That is, the cationic group may be introduced first, or inhibition may be performed before the cationic group is introduced. Alternatively, the different groups may be added simultaneously. While the degradation step may be accomplished at any point during the process, i.e. after cationization but before inhibition, it is particularly suitable to have the degradation as the first step in the process.

The modified starch additive of this invention may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical, thermomechanical, chemithermomechanical, chemiground wood, ground wood, recycle or any combination of these fibers. Fibers of the viscose rayon, regenerated cellulose, cotton and the like may also be used if desired.

Any desired inert mineral fillers may be added to the pulp which is to be utilized with the improved starch derivatives of this invention. Such materials include clay, titanium dioxide, talc, calcium carbonate, calcium sulfate and diatomaceous earths. Rosin may also be present, if desired.

Other additives commonly introduced into paper may be added to the pulp or furnish, for example, dyes, pigments, sizing additives, alum, retention aids, etc.

In addition to the selected starch derivative and other components that may be included in the papermaking system as described above, colloidal inorganic minerals may be added to the system to form an alkaline microparticle system. Such microparticle systems include colloidal silica, bentonite, or the like and may be incorporated into the system in amounts of at least 0.001% and more particularly from about 0.01 to 1% by weight based on the weight of dry pulp. Further description of such microparticle inorganic materials may be found in U.S. Pat. No. 4,388,150 issued Jun. 14, 1983; U.S. Pat. No. 4,643,801 issued Feb. 17, 1987; U.S. Pat. No. 4,753,710 issued Jun. 28, 1988 and U.S. Pat. No. 4,913,775 issued Apr. 3, 1990; all of which are incorporated herein by reference.

The amount of modified starch derivative (i.e. degraded, inhibited, cationic) that may be added to the wet end or paper pulp will be an effective amount to provide the desired property (e.g. strength, drainage or retention). Typically an amount from about 0.05 to 5% of the starch derivative, most suitably from about 0.1 to 2%, by weight based on the dry weight of the pulp will be used.

One embodiment of this invention is that the dry starch can be added directly to the papermaking system at any convenient place, where elevated temperatures exist, before the formation of the sheet. Examples can include, but are not limited to, the head box, pulper, machine chest, blend chest, stuff box or white water tray.

Alternatively, the starches can be dispersed into water before being added to the papermaking process. Typically this is accomplished by slurrying the granular starch product at about 0.1 to 30 percent solids into water and adding directly to the machine prior to the head box. The slurry may be heated between about 40 and 100° C., particularly between 60 and 70° C. or the starches can be added to preheated water from any source. It would be advantageous to use recycled water from common processes in the papermill, such sources could include the whitewater, or other equipment or processes that produce warm/hot water as a by-product of their operation.

While it is ideal to disperse these starches into water at less than 100° C., it would be obvious to one skilled in the art to cook these starches at typical elevated temperatures. Examples of the cooking techniques that could be used are jet cooking, batch cooking, steam injection, pressure-cooking and the like.

When prepared as described above, the starches of this invention provide the papermaker many advantages over what is currently available. Being easy to prepare and requiring less temperature to disperse the granular starch results in energy and equipment savings and reduced worker exposure to high temperature liquids and hot equipment. In addition to the typical benefits obtained from traditional starches, the derivatives of this invention provide better resistance to the shear of today's high speed machines and pumps. Improved strength, particularly in high conductivity or partially closed systems, affords papermakers the ability to prepare sheets lighter in weight and thus save on pulp costs.

This invention is further illustrated by the following examples, which are not meant to limit the scope or utility.

All parts and percentages are given by weight and temperatures in degrees Celsius unless otherwise noted.

EXAMPLES

Example 1
Preparation of Degraded, Cationic Inhibited Starch

This example illustrates the preparation of a converted or degraded, inhibited, and cationic modified starch (WF=40, Epi 20 ppm, Quat 5% treatment).

A starch slurry was prepared by suspending 3000 g. dry basis of waxy maize starch in 4500 ml of water. The mixture was stirred at room temperature and 950 g of 3% aqueous NaOH solution was added slowly. An alkalinity titration of a 25 ml aliquot gave 19.2 ml HCl (0.1N), where a minimum alkalinity titration of 18 ml is required. To this mixture, 7.5 g of a 0.002% aqueous solution of potassium permanganate was added. Then 5.7 g of 30% $H_2O_2$ was added to the starch slurry over 3 minutes causing the pH of the slurry to drop (25 ml aliquot gave 18.4 ml HCl). The reaction was held for 16 hours until no hydrogen peroxide remained, as indicated by a negative test on hydrogen peroxide test strip. The resulting starch was found to be degraded to a water fluidity (WF) of 39.2.

The temperature of the starch slurry was raised to 40–43° C. 0.06 g epichlorohydrin (20 ppm by weight of dry starch) was added to the starch slurry and reacted for 16 hours to inhibit the starch. To the starch slurry was added 150 g. of (3-chloro-2-hydroxypropyl)trimethyl ammonium chloride (added as a 65% aqueous solution) with simultaneous addition of 31.9 g sodium hydroxide as a 20% solution to maintain an alkalinity titration of 20–23 ml. After 16 hours at temperature (40–43° C.), the slurry was neutralized to a pH of 6.0 with dilute hydrochloric acid. The starch was recovered by filtration. The product had a nitrogen content of 0.30%.

Example 2
Hot Paste Viscosity

A sample of starch is suspended in water to a Be of 1.0 at 21° C., heated at 95° C. for 10 minutes, and the viscosity measured on a Brookfield viscometer at 20 rpm using a #21 spindle.

TABLE 1

Hot paste viscosity

| # | Starch Type | Hot Paste Viscosity cps |
|---|---|---|
| 1 | Cationic[1] Waxy | 475 |
| 2 | Cationic[1] Waxy (wf = 18, 20 ppm epi) | 230 |
| 3 | Cationic[1] Waxy (wf = 40, 135 ppm epi) | 55 |

[1]Samples contain 0.3% Quat N as per example 1.

This table illustrates the hot paste viscosity of undegradaded starches are typically about 500 cps and fluidity starches of this invention are considerably less viscous.

Example 3
Water Fluidity Measurement

The water fluidity of the starches were measured using a Thomas Rotational Shear-Type Viscometer (manufactured by Arthur H. Thomas Co., Philadelphia, Pa. 19106), standardized at 30° C. with a standard oil having a viscosity of 24.73 cps (23.12+/−0.05 sec for 100 revolutions). The starch, 6.16 g (dry basis), was slurried into a total of 100 g of deinoinizd water in a covered copper cup and heated in a boiling water bath for 30 minutes with occasional stirring. The starch dispersion was then brought to the final weight (106.16 g) with distilled water and added to a preheated viscometer. The time required for 100 revolutions of the resultant dispersion at 81–83° C. was recorded and converted to a water fluidity number using a conversion table.

Example 4
Peak Viscosity Measurement

A rapid viscoanalyzer (available from Foss-Food Technology, Model RVA-4) was preheated to 55° C. The sample of starch slurry was prepared by adding 0.84 grams (dry basis, washed to removed residual salts) of starch to a total of 27.16 grams of DI water. Typically the pH of the sample was between 5.7 and 6.0, if not the pH was adjusted with dilute acid or base as needed. The sample was placed in the viscometer and stirred at 160 rpm using a standard spindle and held at 55° C. for one minute. The viscometer was then heated at a rate of 1° C./min. to 80° C. then held for 10 minutes. The viscosity was recorded during the entire heating cycle, with the reportable peak viscosity being the highest viscosity during that cycle.

Example 5
Strength Properties

All TAPPI tests and procedures described below can be found in "2000–2001 TAPPI test methods, TAPPI Press, Technology Park, Atlanta, Ga.". Unbleached softwood Kraft fiber was refined according to TAPPI T 200 to a freeness of 500 CSF (TAPPI T 227). The pulp was diluted to 0.6% consistency. Starches made in example 1 were prepared for use by warming in a hot water bath at 65° C. under agitation at 1% solids for 20 minutes at temperature. Starches prepared at 113° C. were jet cooked at 4% solids, 20% steam and a throughput of 127.6 ml/min. then diluted to 1% solids with cool water. All starches were mixed with 0.6% stock at a level of 30 lb./ton (1.5% on dry weight of pulp) and 1% solids for 30 seconds prior to sheet formation. Handsheets were formed on a manual M/K sheet former, pressed and dried at a basis weight of 33 lb/1000 $ft^2$ (160 $g/m^2$). Mullen Burst Strength was tested according to TAPPI T 807. Ring Crush was tested according to TAPPI T 822.

TABLE 2

Strength Performance of Starches at 30 lb./ton.

| # | Starch | Temp. (° C.) | Burst Strength (kPa) | Ring Crush (N) |
|---|---|---|---|---|
| 1 | Inhibited Cationic Waxy[1] | 113 | 879 | 385 |
| 2 | Inhibited Cationic Waxy[1] | 65 | 950 | 388 |
| 3 | Inhibited Cationic Waxy[2] | 65 | 1007 | 386 |
| 4 | Degraded Inhibited Waxy[3] | 65 | 1129 | 417 |

[1]Contains 135 ppm epi inhibition and 0.3% Quat nitrogen.
[2]Contains 500 ppm epi inhibition and 0.3% Quat nitrogen.
[3]Contains 0.3% Quat nitrogen, w.f. = 40, 20 ppm epi inhibition.

Table 2 illustrates the improved performance of degraded inhibited starches compared to traditional papermaking starches.

Example 6
High Conductivity Systems (Recycle)

Recycle pulp (OCC) was prepared as in Example 5. 100 ppm of dissolved Indulin AT lignin was added to pulp at 0.6% consistency, and the pulp was then adjusted to 4000 µS with $Na_2SO_4$. Starches were prepared at the indicated temperature (see table 3) in a hot water bath under agitation at 1% solids for 20 minutes at temperature. All starches were mixed with stock at a level of 30 lb/ton (1.5% on dry weight of pulp) for 30 seconds prior to sheet formation. Handsheets were formed on a manual M/K sheet former, pressed and dried at a basis weight of 33 lb/1000 ft$^2$ (160 g/m$^2$). Mullen Burst Strength was tested according to TAPPI T 807.

TABLE 3

Strength Performance of Starch in Recycle Simulation.

| Ex # | Starch | Temp. (° C.) | Burst Strength (kPa) |
|---|---|---|---|
| 1 | Cationic Waxy, 0.3% Quat N | 55 | 920 |
| 2 | Inhibited Cationic Waxy, 135 PPM epi, 0.3% Quat N$^1$ | 55 | 948 |
| 3 | Inhibited Cationic Waxy, 500 PPM epi, 0.3% Quat N$^2$ | 55 | 907 |
| 4 | Degraded Inhibited Waxy (40 WF, 20 PPM epi, 0.3% Quat N) | 55 | 1022 |
| 5 | Degraded thermally inhibited Waxy (67 WF, 5 min/320° F., 0.3% Quat N) | 55 | 1035 |
| 6 | Degraded Crosslinked Tapioca (36 WF, 20 PPM epi, 0.3% Quat N) | 55 | 1112 |
| 7 | Inhibited Cationic Waxy, 500 PPM epi, 0.3% Quat N$^2$ | 70 | 947 |
| 8 | Degraded Cationic Waxy (40 WF, 0.3% Quat N) | 70 | 1030 |
| 9 | Degraded Inhibited Waxy (40 WF, 0.3% Quat N, 20 PPM epi) | 70 | 1073 |
| 10 | Degraded thermally inhibited Waxy 67 WF, 5 min/320° F., 0.3% Quat N | 70 | 1071 |

$^1$as described in Solarek, et al, 5,523,399.
$^2$as described in Anderson 5,122,231.

Table 3 illustrates the improved strength performance of degraded crosslinked starches over traditional starch products at temperatures typically found in linerboard systems. This strength is achieved using recycled fiber despite the presence of salts and anionic contaminants such as lignin.

Example 7
Impact of Inhibition on Compression Strength

OCC pulp and starches were prepared as in Example 6. Handsheets were made as in example 6 at a basis weight of 33 lb/1000 ft$^2$ (160 g/m$^2$). The 40 WF data was obtained from handsheets made on a manual M/K sheet former. The 67 WF data was obtained from handsheets made on a series 9500 semi-automatic M/K sheet former, so the strength values are not directly comparable. STFI compression strength tests were run following the TAPPI standard procedure T 826. The % improvement results show similar results for all levels of degradation compared to the standard (no inhibition).

TABLE 4

Effect of Inhibition Level on Compression Strength

| Sample* # | Degradation Level | Peak Viscosity (cps) | Level of Inhibition (epi) | % of Standard |
|---|---|---|---|---|
| 1 | 18 WF | 270 | 0 | 100 |
| 2 | " | 410 | 10 ppm | 98 |
| 3 | " | 576 | 20 ppm | 103 |
| 4 | " | 981 | 40 ppm | 99 |
| 5 | 40 WF | 49 | 0 | 100 |
| 6 | " | 76 | 20 ppm | 103 |
| 7 | " | 105 | 40 ppm | 107 |
| 8 | " | 216 | 80 ppm | 111 |
| 9 | " | 273 | 135 ppm | 104 |
| 10 | 67 WF | 17 | 0 | 100 |
| 11 | " | 21 | 80 ppm | 102 |
| 12 | " | 22 | 135 ppm | 104 |
| 13 | " | 56 | 200 ppm | 112 |

TABLE 4-continued

Effect of Inhibition Level on Compression Strength

| Sample* # | Degradation Level | Peak Viscosity (cps) | Level of Inhibition (epi) | % of Standard |
|---|---|---|---|---|
| 14 | " | 93 | 300 ppm | 106 |
| Comp A$^1$ | 0 WF | 1603 | 135 ppm | 98 |
| Comp B$^2$ | 0 WF | 2711 | 500 ppm | 100 |

*All samples contain 0.3% Quat nitrogen and prepared at 55° C.
$^1$as described in Solarek, et al, 5,523,399.
$^2$as described in Anderson 5,122,231.

One skilled in the art would recognize the significance of improvements of these magnitudes from a chemical additive. The examples shown in table 4 demonstrate the relationship between degradation and inhibition level. The optimum level of degradation and inhibition will vary depending on application parameters. The amount of degradation or subsequent level of inhibition has little to no effect on the dispersion temperature or means of preparation.

Example 8
Thermally Inhibited Starches

A sample of waxy maize (1000 g) was slurried in 1500 mls of tap water and the pH was adjusted to 9.5 using dilute sodium hydroxide (3%). The starch was filtered and allowed to air dry at room temperature overnight. A convection oven was preheated to 80–90° C. A total of 300 grams of the dry pH adjusted starch was placed in the oven and dried to less than 1% total moisture. The oven was quickly ramped to 160° C. and once at temperature 100 gram aliquots were removed at 5 minute intervals. The samples were allowed to cool and then suspended in tap water and the pH adjusted to about 5.8 using dilute aqueous HCl. The starches were allowed to air dry at room temperature and the peak viscosity was recorded as shown in table 5.

TABLE 5

Peak viscosity of thermally inhibited Waxy Maize

| Ex # | Sample | Peak Viscosity (cps) |
|---|---|---|
| 1 | 67 WF Waxy, no heating | 17 |
| 2 | 67 WF Waxy, 5 Min. @ 160° C. | 41 |
| 3 | 67 WF Waxy, 10 Min. @ 160° C. | 46 |
| 4 | 67 WF Waxy, 15 Min. @ 160° C. | 104 |

This example shows that thermal inhibition can produce similar peak viscosities as compared to chemical inhibition.

We claim:

1. A degraded, inhibited, catianic starch prepared by degrading a starch, inhibiting the degraded starch with an inhibition agent in an amount of about 0.001% to about 0.05% by weight of dry starch, and cationically treating the starch, wherein the steps of inhibiting and cationically treating the starch occur concurrently with or subsequently to one another.

2. The degraded, inhibited, cationic starch of claim 1 wherein the final peak viscosity of the starch is less than about 500 centipoise.

3. The degraded, inhibited, cationic starch of claim 1 wherein the final peak viscosity of said starch is about 110 to about 1000 percent of a non-inhibited degraded cationized starch viscosity.

4. The degraded, inhibited, cationic starch of claim 3 wherein the final peak viscosity of the starch is about 130 to about 800 percent of the viscosity of the non-inhibited degraded cationic starch.

5. The degraded, inhibited, cationic starch of claim 1 wherein the starch is chosen from the group consisting of corn, tapioca, potato and sago and their waxy and high amylose versions thereof.

6. The degraded, inhibited, cationic starch of claim 1 wherein the starch is inhibited chemically.

7. The degraded, inhibited, cationic starch of claim 6 wherein the starch is inhibited with epichlorohydrin.

8. The degraded, inhibited, cationic starch of claim 1 wherein the starch is inhibited thermally.

9. The degraded, inhibited, cationic starch of claim 1 wherein the degraded starch has a WF of about 15 to 85.

10. The degraded, inhibited, cationic starch of claim 9 wherein the degraded starch has a WF of about 20 to 70.

11. The degraded, inhibited, cationic starch of claim 10 wherein the degraded starch has a WF of about 35 to 65.

12. The degraded, inhibited, cationic starch of claim 1 wherein the cationic group is a quaternary ammonium derivative.

13. The degraded, inhibited, cationic starch of claim 2 wherein the degraded, cationic, inhibited starch has a peak viscosity of less than 250 centipoise.

14. The degraded, inhibited, cationic starch of claim 1 wherein the starch is modified to contain a quaternary amine.

15. A process for preparing a degraded, inhibited, cationic starch comprising the steps of:

degrading the molecular weight of a native starch, inhibiting the degraded starch with an inhibition agent in an amount of about 0.001% to about 0.05% by weight of dry starch, and chemically modifying the degraded starch with a cationic reagent, wherein the steps of inhibiting and chemically modifying the degraded starch with a cationic reagent occur concurrently with or subsequently to one another.

16. The process of claim 15, wherein the inhibition is produced thermally.

17. A process for making paper comprising the steps of adding the starch of claim 1 to a papermaking system.

18. The process of claim 17 wherein the starch is added in granular form.

19. A paper article comprising the starch of claim 1.

20. A paper article comprising the starch produced by the process of claim 15.

21. A modified starch composition comprising:

a degraded starch, an inhibition agent in an amount of about 0.001% to about 0.05% by weight of dry starch, and a cationization derivative.

22. The modified starch composition of claim 21 wherein the starch is degraded to a water fluidity of about 15 to about 85.

23. The modified starch composition of claim 22 wherein the starch is degraded to a water fluidity of about 20 to about 70.

24. The modified starch composition of claim 23 wherein the starch is degraded to a water fluidity of about 35 to about 65.

25. The modified starch composition of claim 21 wherein the inhibition agent is provided in an amount of about 0.002% to about 0.0125% by weight of dry starch.

26. Paper made from thin modified starch composition of claim 21.

27. The paper of claim 26 comprising about 0.05% to about 5.0% by weight of the modified starch composition based on the dry weight of the pulp.

28. The paper of claim 27 comprising about 0.1% to about 2.0% by weight of the modified starch composition based on the dry weight of the pulp.

29. The modified starch composition of claim 21 wherein the final peak viscosity of the composition is less than about 500 centipoise.

30. The modified starch composition of claim 21 wherein the final peak viscosity of the composition is about 110 to about 1000 percent of the non-inhibited starch composition.

* * * * *